United States Patent [19]

Brun et al.

[11] Patent Number: 4,634,366

[45] Date of Patent: Jan. 6, 1987

[54] INJECTION MOLDING MACHINE

[75] Inventors: Philip L. Brun, Dayton; Stephen A. Bright, Troy, both of Ohio

[73] Assignee: Electra Form, Inc., Vandalia, Ohio

[21] Appl. No.: 668,953

[22] Filed: Nov. 7, 1984

Related U.S. Application Data

[62] Division of Ser. No. 439,760, Nov. 8, 1982, Pat. No. 4,497,624.

[51] Int. Cl.$^4$ .................. B29C 35/16; B29C 45/73
[52] U.S. Cl. ..................... 425/526; 264/328.14; 264/328.15; 425/537; 425/547; 425/549; 425/568; 425/570; 425/572; 425/588
[58] Field of Search ............... 425/183, 185, 533, 537, 425/542, 547, 549, 552, 554, 556, 567, 568, 569, 570, 577, 588, 548, 572, 526; 264/537, 538, 328.14, 328.15

[56] References Cited

U.S. PATENT DOCUMENTS

| | | | |
|---|---|---|---|
| 2,828,509 | 4/1958 | Smucker et al. | 425/552 |
| 2,871,517 | 2/1959 | Allard | 18/30 |
| 3,264,684 | 8/1966 | Moslo | 18/5 |
| 4,125,352 | 11/1978 | Gellert | 425/566 |
| 4,140,464 | 2/1979 | Spurr et al. | 425/533 |
| 4,201,535 | 5/1980 | Ninneman | 425/548 |
| 4,231,987 | 11/1980 | Osawa et al. | 264/328.1 |
| 4,260,360 | 4/1981 | Holmes et al. | 425/548 |
| 4,321,029 | 3/1982 | Aoki | 425/523 |
| 4,340,353 | 7/1982 | Mayer | 425/548 |
| 4,348,165 | 9/1982 | Vostrovsky | 425/185 |
| 4,379,104 | 4/1983 | Koorevaar | 264/45.5 |
| 4,383,819 | 5/1983 | Letica | 425/577 |

FOREIGN PATENT DOCUMENTS 1193141  5/1970  United Kingdom .

OTHER PUBLICATIONS

Modern Plastics Encyclopedia, 1981–1982, pp. 417, 418, 422, 424.

Primary Examiner—Jay H. Woo
Assistant Examiner—Timothy W. Heitbrink
Attorney, Agent, or Firm—Barnes & Thornburg

[57] ABSTRACT

An injection molding machine includes a platen having a plurality of regularly spaced mold element-receiving chambers adapted to receive any of a number of various mold elements substantially wholly within the stationary platen. A hot manifold system is included between the stationary platen and a plastics injector unit, which includes a plurality of blocks independently coupled to the fixed platen, each block having channels through which the plastics material can flow, the channels of adjacent blocks being coupled by a coupling unit. The machine is particularly designed for quick inexpensive mold changes, and has particular utility in laboratory testing of mold designs and small low-capacity production in satellite plants.

18 Claims, 6 Drawing Figures

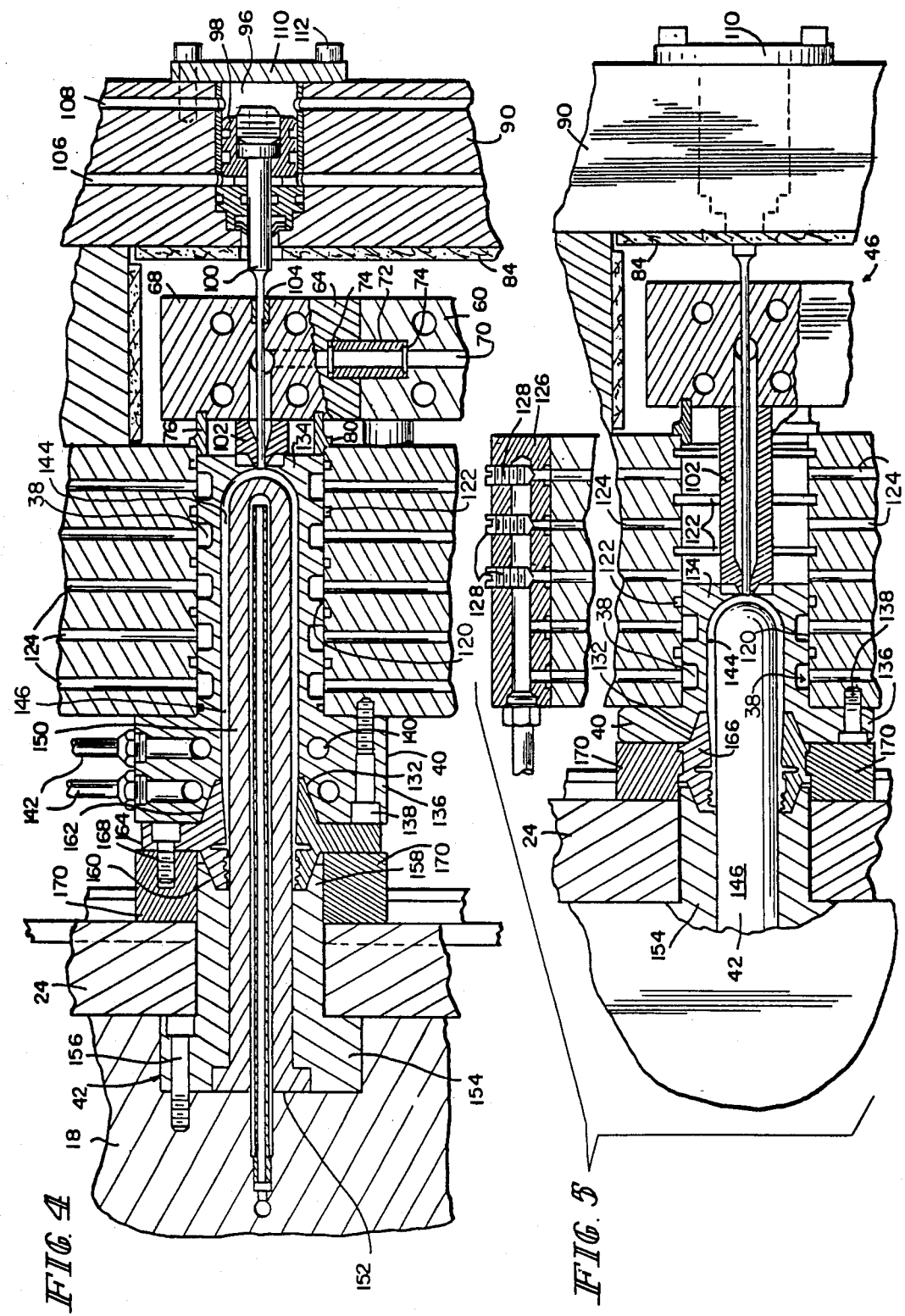

INJECTION MOLDING MACHINE

This is a divisional application of Ser. No. 06/439,760 filed Nov. 8, 1982, now U.S. Pat. No. 4,497,624.

The present invention is directed generally to improvements in injection molding machines, and specifically to improvements in the design of the stationary platen, molds attachable to the stationary platen, and plastics material delivery systems between the stationary platen and a plastics material injector unit.

Conventional injection molding machines comprise a plastics material plasticating and injection unit, which unit is usually of the reciprocating screw design, but is occasionally of the two-stage design, including a fixed screw plasticator having attached thereto a reservoir with a plunger-type injector. The plasticating-injection unit is intended to take particulate plastics material and subject it to mechanical working and thermal conditioning to such a point that it can flow under an applied pressure into a mold to form a desired article.

The mold typically comprises a pair of mold units commonly referred to as the male and female mold part and also commonly referred to as the core and cavity, respectively. The mold portions or units are usually mounted to a pair of platens, one of which is fixed to the plasticating-injection unit. The platen not so fixed to the plasticating-injection unit is movable with respect to the fixed platen by means of a clamping system intended to open and close the mold and, when necessary, subject the mold to clamping pressures.

Three principal clamp designs in conventional use are mechanical clamps, also known as toggle link clamp systems, hydromechanical clamps which are similar to the former but typically include a pancake hydraulic cylinder for applying the clamp pressure, and fully hydraulic clamps which typically are multi-stage in design. The present invention can be used with any clamp design.

While there are many variations in injection molds, certain basic designs are in common use, and a summary of these basic designs is to be found on pages 417, 418, 422, and 424 of *Modern Plastics Encyclopedia, 1981-1982*. That summary divides the various mold designs into certain classes, namely, conventional two-plate molds; conventional three-plate molds; insulated runner molds; hot manifold molds with auxiliary nozzles; and internally heated distributer systems with heated probes. Each of the systems there disclosed includes a clamping plate or platen on one side of which is located the conventional plasticating-injection unit and on the other side of which is located the mold system of one of the selected designs there summarized. The conventional hot manifold mold system is of particular interest to the present invention.

In a conventional hot manifold system, a heated manifold typically including a cartridge heater is situated on the mold side of the fixed platen or clamping plate, and receives the plasticated plastics material from the injector through a central aperture in the clamping plate. The manifold is connected to a plurality of nozzles, each of which are connected to a cavity or mold unit which are maintained with the aid of a cavity retainer plate which is spaced from the fixed clamping platen. Various problems have been observed with this design, and the present invention is intended to be an improvement on this basic design.

In the present invention, the stationary platen of clamp plate is itself provided with a plurality of mold element-receiving chambers extending through the platen. A plurality of cooling channels penetrate the platen to intersect the mold element-receiving chambers, and means are provided for securing mold elements substantially wholly within the stationary platen. A hot manifold system is then coupled to the stationary platen on the face of the platen adjacent the plasticator-injector unit.

The manifold system itself includes a plurality of unit blocks, each block having an independent means for coupling the block to the surface of the platen adjacent other blocks of the manifold system. Each block includes appropriate channels for transporting the plastics material. There is further provided a coupling means for coupling the channels of adjacent blocks together. Each of the blocks independently undergoes thermal expansion upon heating about the center of the block unit, and the size of the blocks is chosen such that space is provided between adjacent blocks for the free thermal expansion to take place.

The machine of the present invention is designed to accept easily replaceable mold elements, any mold changes being simply achieved by the simple substitution of mold elements within the platens rather than the replacement of whole mold base-mold units as is conventional. Further, since the mold elements are themselves retained in the platens, no leader pins are necessary since adequate alignment of the core and cavity mold elements are provided by the tie rods on which the platens move.

The design allows more strategic placement of the hot manifold between the plasticating injection unit and the platen instead of being sandwiched between the mold plates where thermal expansion can create dimensional alignment problems. The modular design of the manifold itself permits quick changes in manifold components to achieve various end effects as changes in molding requirements dictate.

The machine has particular utility as a pre-production laboratory testing apparatus or for small capacity production at modest capital cost with standardized tooling. Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

FIG. 4 is a sectional detailed view of the invention including a cross section of selected core and cavity mold elements;

FIG. 5 is a view similar to FIG. 4 but with an alternative embodiment for the core and cavity mold elements.

Figure 1:
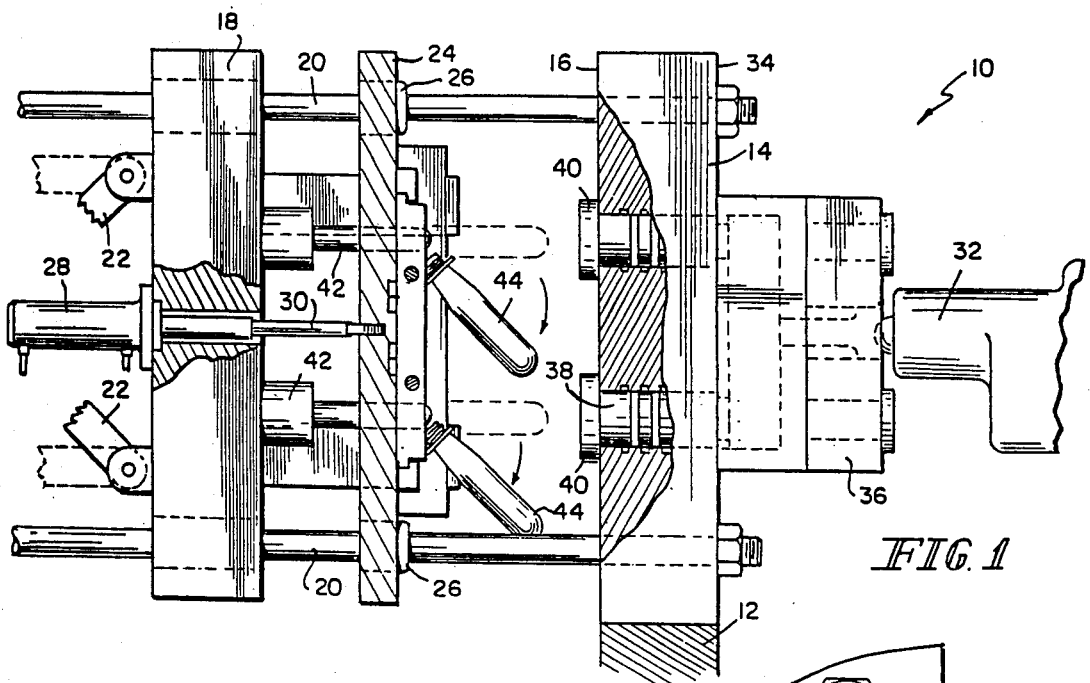
FIG. 1 is a side elevation view partially broken away of an injection molding machine of the present invention.

An injection molding machine 10 according to the present invention is shown generally in FIG. 1 to include a base 12 and a stationary platen 14 which is fixed with respect to the base. The stationary platen 14 has a front face 16 facing a movable platen 18 which moves in the conventional manner on guide means 20 typically referred to as tie rods. The movement of movable platen 18 is achieved by a conventional clamping means only partially illustrated by toggle links 22. The clamping means can be any conventional mechanical, hydromechanical, or hydraulic clamping mechanism.

Situated between the stationary platen 14 and the movable platen 18 is stripper platen 24 which also is guided for movement on tie rods 20 by means of bushings 26. The stripper platen 24 is moved with respect to the movable platen 18 by means of a power means such as hydraulic stripper cylinder 28 having piston rod 30 extending through the movable platen 18 and secured to stripper platen 24.

A plasticating-injector unit 32 is coupled to the back face 34 of fixed platen 14 by means of a heated manifold assembly 36. The manifold assembly 36 directs plastics material from the plasticating-injector unit 32 to one or more mold element-receiving chambers 38 in the stationary platen 14. A mold element or cavity 40 is situated substantially wholly within each mold element-receiving chamber 38. Corresponding second mold elements or cores 42 are connected to movable platen 18, the cavities 40 and cores 42 being cooperatively engageable to one another to form therebetween a space for receiving the plastics material from the manifold means 36 to form molded elements 44 shown in FIG. 1 as they are being ejected. While the specific examples illustrated in the figures are directed to the injection molding of parisons or preforms for the blow-molding of plastics bottles and containers, this use is merely illustrative and is not intended to restrict the scope of utility of the invention described and claimed.

Figure 3:
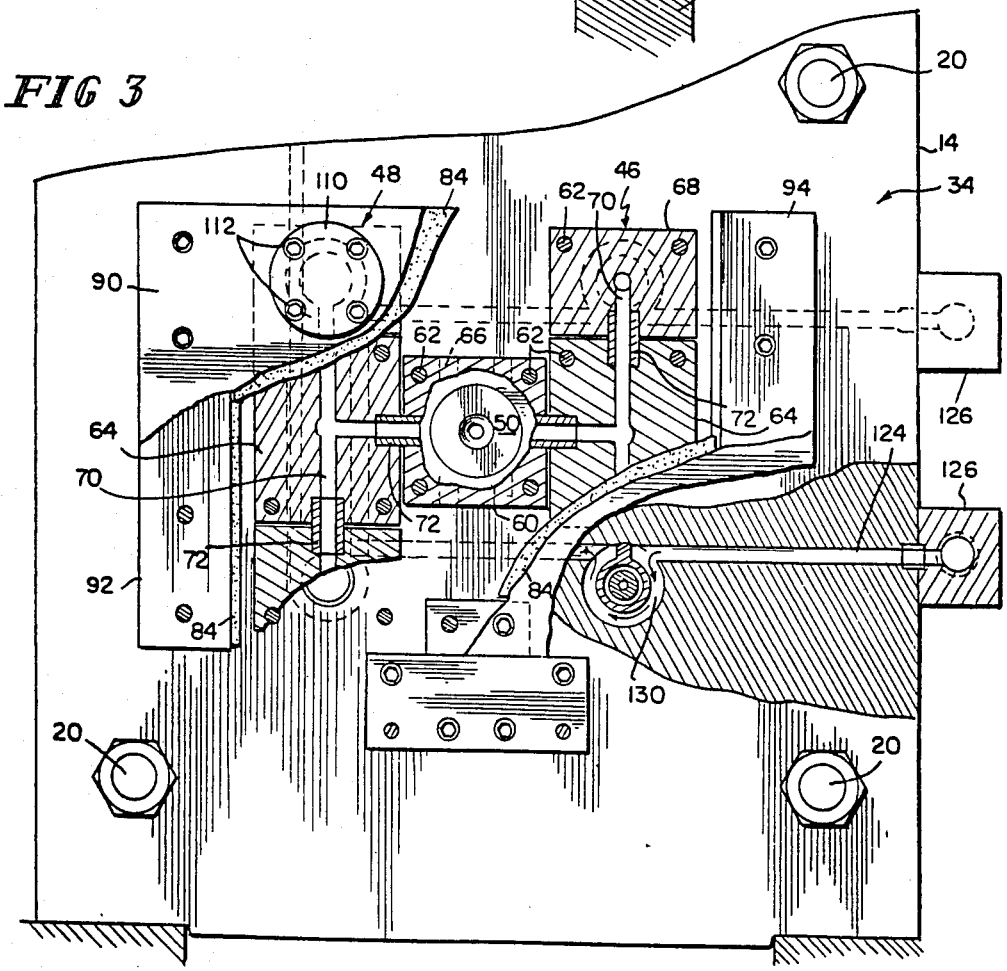
FIG. 3 is an elevational view from the right side of FIGS. 1 and 2 partially broken away.
Figure 2:
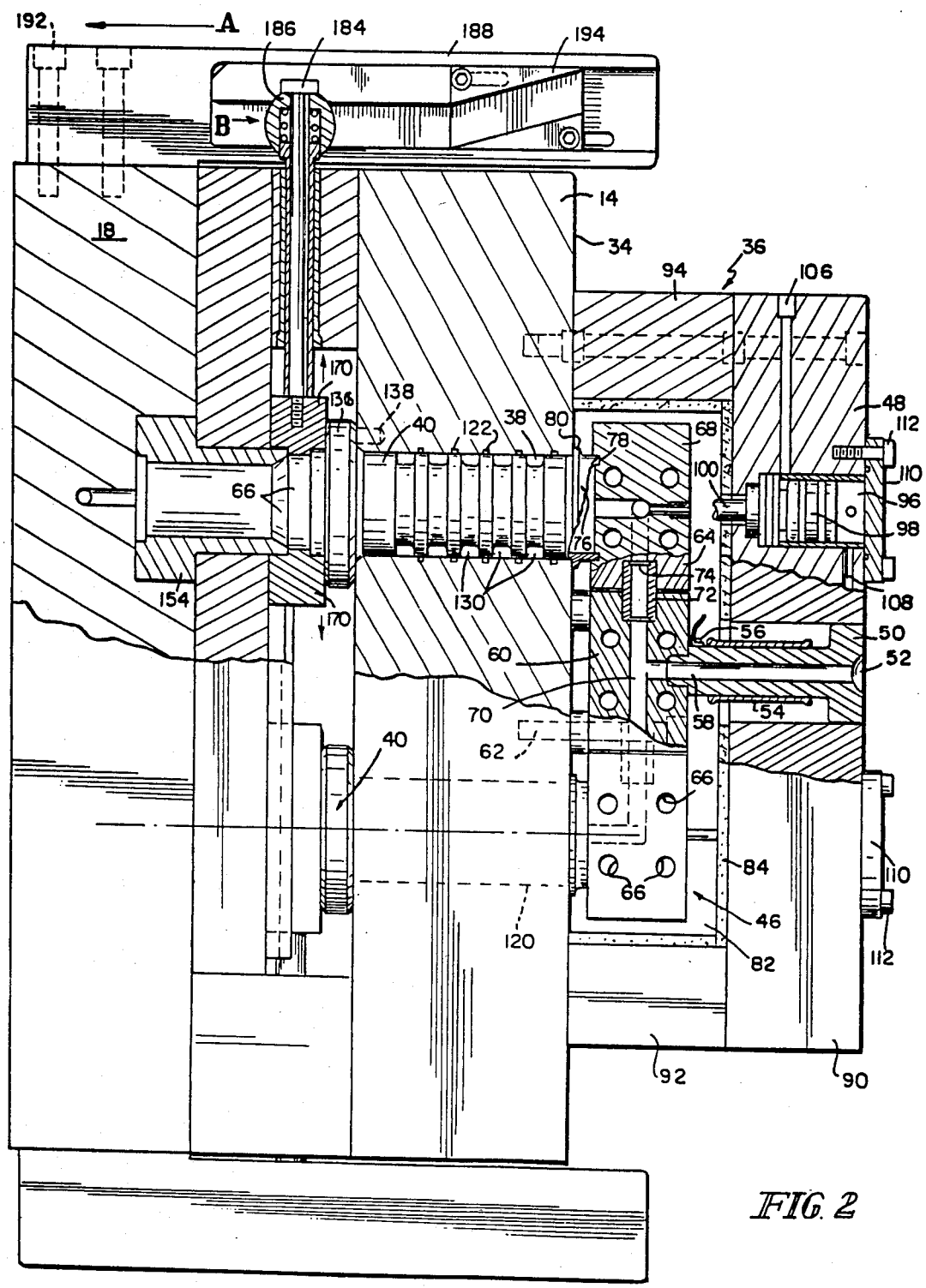
FIG. 2 is a top plan view partially broken away of an injection molding machine of the present invention.

The injection molding machine of the present invention is shown in FIG. 1 with the movable platen 18 separated from the fixed platen 14 by the distance necessary to eject the molded parts 44. In FIGS. 2, 4, and 5, the apparatus 10 is shown in its clamped position. The structural details of the manifold means 36 are revealed in FIGS. 2 and 3 where the manifold means 36 is seen to comprise a manifold block assembly 46 which is fixed to the back face 34 of the stationary platen 14 and a gating means 48 which controls the introduction of plastics material from the manifold block assembly 46 into the molds 40.

The illustrated manifold block assembly 46 comprises a sprue bushing 50, the back end 52 of which mates with the output nozzle of the plasticator-injection unit 32. The sprue bushing 50 is surrounded by a conventional band heater 54 controlled by thermocouple 56. The forward end 58 of the sprue bushing 50 projects into the center manifold block 60 which is secured to the back face 34 of fixed platen 14 by screw-fitted fasteners 62.

A pair of distribution blocks 64 are mounted on either side of central block 60 by additional fasteners 62 and are separated from block 60 by a distance sufficient to permit thermal expansion of the blocks when subjected to heating. The heating of the manifold blocks is achieved by means of conventional electrical resistance cartridge heaters inserted in openings 66 which extend vertically through the manifold block system 46.

Each of the distribution blocks 64 is in turn connected to end blocks 68 which are also independently secured to the back face 34 of fixed platen 14 by fasteners 62. Each of the blocks 60, 64, 68 has within it channel means 70 for transporting plastics material from the sprue bushing 50 to the mold cavities 40. A channel bushing 72 is situated in the channel 70 and bridges each pair of adjacent blocks 60, 64, 68 so as to couple the channels 70 in adjacent blocks. The channel bushings can be further sealed at each end by O-rings 74.

The end blocks 68 are positioned with respect to mold cavities 40 by means of support rings 76 which extend into an annular recess 78 in block 68 and are received in the end of mold element-receiving chamber 38 adjacent face 34 of fixed platen 14. The support ring 76 includes an outwardly extending flange 80 which abuts the back surface 34 of fixed platen 14.

The entire manifold block assembly 46 is surrounded by a channel or chimney 82 which can most advantageously be surfaced by insulator board 84 mounted to the inside surface of the gating means 48.

The gating means 48 comprises generally a gate block 90 fixed to the back surface 34 of stationary platen 14 and spaced therefrom by rails 92 and 94. A plurality of cylinders 96 are provided in block 90, the cylinders 96 containing double-acting pistons 98 connected to valve rods 100 which project through end blocks 68 to needle gate valve 102, two different embodiments of which are shown in FIGS. 4 and 5. A valve bushing 104 surrounds each valve rod 100 as it projects through the back surface of each end block 68 as shown in FIG. 4.

The position of the piston 98 within cylinder 96 is determined by hydraulic pressure in lines 106 and 108 which penetrate valve block 90. The rearward end of each cylinder 96 is closed by end cap 110 which is removably fastened by fasteners 112 and provides ready access to the various elements of the gate valving mechanism to control the operation thereof and hence the delivery of plastics material to the molds 40.

The molds 40 are substantially wholly received within cylindrical mold-receiving chambers 38 which extend through the fixed platen 14 from the front face 16 to the back face 34 of platen 14. Each chamber 38 is defined by a generally cylindrical wall surface 120 having a plurality of longitudinally spaced O-ring-receiving grooves 122 therealong. Cooling channels 124 extend through the fixed platen 14 to open into the mold-receiving chambers 38 between the grooves 122 to provide a cooling liquid, typically chilled water, to cool the outside surface of mold elements 40. A water manifold 126 is fixed to the side of platen 14 and acts to distribute the chilled water from a central source to the cooling channels 124. When cooling is not desired, one or more channels in the manifold 126 may be selectively blocked by blocking means 128 as shown in FIG. 5.

The molds 40 which are received within the receiving chambers 38 are themselves circumscribed by a plurality of channels 130 through and around which the cooling fluid circulates. The channels 130 extend substantially completely around the perimeter of the mold cavity elements 40. The mold cavity elements further include an opened end 132 and a substantially closed end 134. The valve gate 102 contacts the substantially closed end 134 with the valve rod 100 closing the small open portion of the closed end 134 of the mold element 40. The open end 132 includes a radially projecting collar or ring 136 for retaining the mold element within the fixed platen 14 by means of appropriate fasteners 138. In certain circumstances such as that illustrated in FIG. 4, the ring portion 136 may include additional cooling channels 140 which are coupled to manifold 126 by means of pipes or tubes 142. Even where the enlarged ring portion 136 as shown in FIG. 4 is employed, the major longitudinal portion of cavity element 40 is received wholly within chamber 38 of platen 14.

Between the inside surface 144 of cavity insert 40 and the outside surface 146 of mold element 42 is a space which receives the plastics material to form the part 44 to be manufactured by the molding machine 10. The core portion of the mold 42 is shown to comprise a stem portion 150, the base 152 of which contacts the movable platen 18 and is retained in position by collar 154 which surrounds the stem portion 150 and is secured to the movable platen 18 by fastening means 156. The top end 158 of collar 154 includes a chamfered portion 160. In like manner, the open end 132 of core portion 40 includes a chamfer 162.

When molding bottle parisons or preforms as shown, a conventional thread split 164 as shown in FIG. 4, or 166 as shown in FIG. 5, engages chamfered portions 160 and 162. The thread split 164 or 166 acts to complete the definition of the outside of the article 44 to be molded and, as described subsequently, acts to remove the molded article 44 from the core stem 150.

Figure 6:
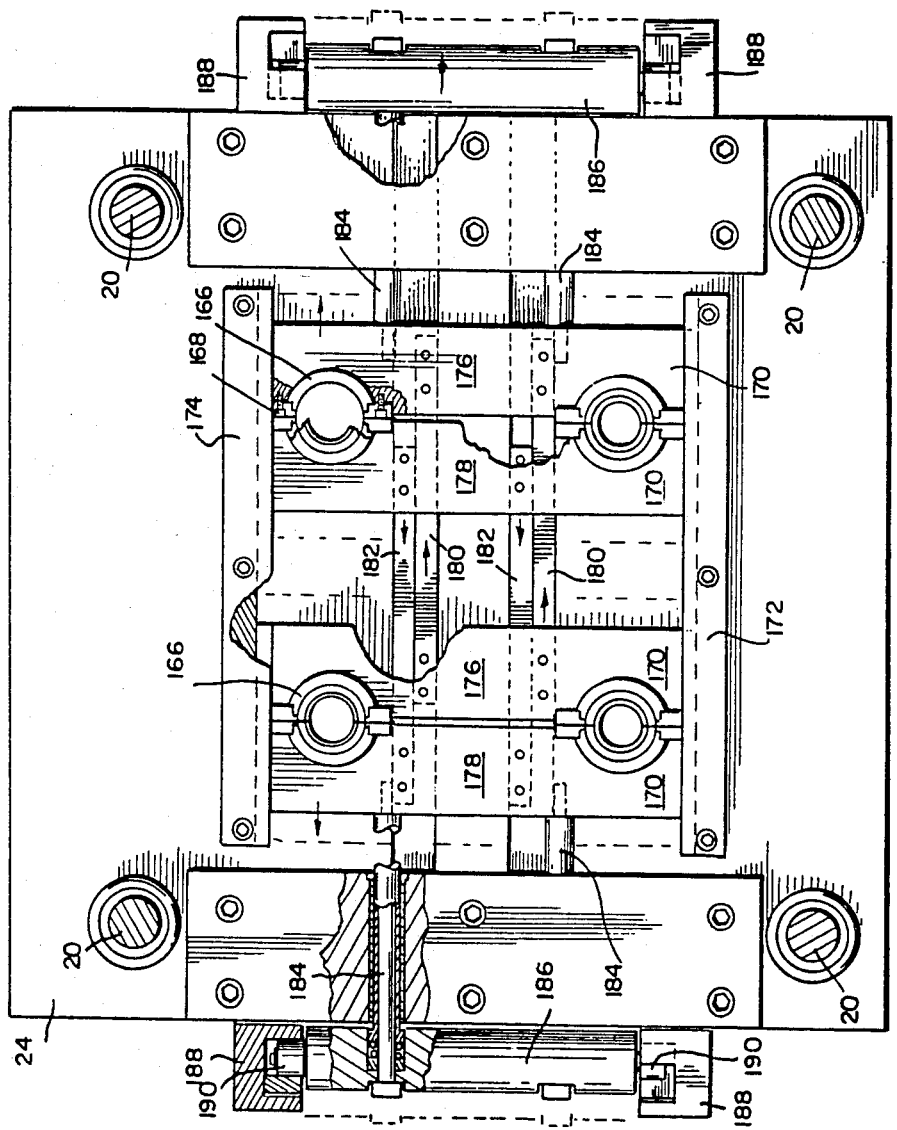
FIG. 6 is an elevational view partially broken away of the stripper platen shown in FIGS. 1 and 2.

The thread splits 164 and 166 are fixed by fastening means 168 to slides 170 mounted to the stripper platen 24 as shown in FIG. 6 by means of support rails 172 and 174. These slides 170 are shown to be arranged in a right pair 176 and a left pair 178. The right pair 176 is tied together by slide straps 180, while the left pair of slides 178 are tied together by slide straps 182 so as to effect simultaneous movement of the slides 176 and 178. The slides are actuated by bolts 184 extending between the outside slide and roller beams 186. The roller beams 186 are in turn engaged in cam tracks 188 by means of roller cam followers 190 on each end of roller beam 186. The cam tracks 188 are secured to movable platen 18 by means of fasteners 192 as shown in FIG. 2.

In operation, as the movable platen 18 moves in the direction A from the position shown in FIG. 2 toward the position shown in FIG. 1, the ejector cylinder 28 causes the stripper platen 24 to move in direction B with respect to the movable platen 18. As the roller cam followers 90 contact the adjustably positionable cam track insert 194, roller beams 186 and, consequently, bolts 184 move outwardly, causing the left slide pair 178 to move one direction and the right slide pair 176 to move the opposite direction, thereby separating the thread splits 166. The separation of the thread splits 166 releases the molded articles 44 as shown in FIG. 1. While the preferred embodiment shows the stripper platen 24 being carried on tie rods 20, alternative embodiments could include a smaller-sized stripper platen riding on leader pins extending from movable platen 18.

With the molding machine in the position shown in FIG. 1, the exchange of either mold portion 40 or 42 is easily achieved by the mere release of the retaining means 138 or 156, respectively. In this manner, quick changes in the parts to be molded can be easily achieved without the difficulties conventionally experienced with more conventional two- and three-plate mold designs.

Although the invention has been described in detail with reference to certain preferred embodiments, variations and modifications exist within the scope and spirit of the invention as described and as defined in the following claims.

What is claimed is:

1. A mold element for use in an injection molding machine wherein the mold element is received substantially wholly within a platen, said platen adapted for retaining a plurality of similarly configured mold elements, the mold element comprising
   a tubular body portion having a substantially closed end and an open end, an inside of the tubular body portion defining a molding cavity for receiving plastics material,
   cooling means comprising a plurality of separate, spaced parallel grooves on the outside of the tubular body portion, and
   retaining means for retaining the tubular body portion in fixed relation to the platen, the retaining means including a ring situated at the open end of, and unitary with, the tubular body portion, the ring having an outside diameter greater than the outside diameter of the tubular body portion, and means for coupling the ring to a forward face of the platen.

2. The mold element of claim 1 wherein each of the plurality of separately, spaced parallel grooves defining the cooling means be in a plane normal to the axis of revolution of the tubular body portion.

3. The mold element of claim 1, wherein said platen is stationary in relation to a movable platen, said moveable platen being configured to carry a mold core that is insertable in the tubular body portion, and said forward face of said stationary platen, is positioned to confront the movable platen so that the mold element is insertable into the stationary platen through a space defined between the stationary platen and movable platen when said movable and stationary platens are separated, thereby permitting the mold element to be fastened to the stationary platen by the coupling means.

4. The mold element of claim 1, wherein the ring is formed to include at least one channel for selectively receiving cooling liquid.

5. A mold element for insertion into a platen of an injection molding machine, the mold element comprising
   a body portion having an inside wall defining a molding cavity for receiving plastics material and an outside wall configured to define a plurality of separate channels for selectively receiving cooling liquids.

6. The mold element of Claim 5, in combination with a platen, said platen comprising
   chamber means for receiving the mold element substantially wholly within the platen, and
   dispensing means for dispensing selected flows of cooling liquid into each of the separate outside wall channels of the old element disposed in the chamber means.

7. The mold element of claim 5, in combination with a platen said platen comprising
   chamber means for receiving the mold element substantially wholly within the platen, and
   a plurality of separate conduit means for delivering cooling liquid to each of the plurality of separate channels formed in the outside wall of the mold element disposed in the chamber means.

8. The combination of the mold element and platen of claim 7, wherein the chamber means is configured to guide the mold element along a substantially straight path during insertion of the mold element into the chamber means, each conduit means defines a cooling channel penetrating the platen to intersect the chamber means, each cooling channel is aligned within the platen to extend in a direction generally orthogonal to said straight path, and the separate channels formed in the outside wall of the mold element are situated in spaced-apart parallel relation to one another so that each conduit means is paired in fluid communication with a companion cooling channel.

9. A stationary platen for use in an injection molding machine between a plastics injector and a movable platen, the stationary platen comprising
   a generally rectangular block having a pair of parallel faces and having a plurality of regularly spaced mold element-receiving chambers extending through the platen between the pair of parallel faces,
   a plurality of separate cooling channels penetrating the block generally orthogonal to, and intersecting, each mold element-receiving chamber,
   means for securing mold elements substantially wholly within the block,
   manifold means fixed to a side of the platen in communiation with the plurality of separate cooling channels for distributing cooling liquid to certain cooling channels, and
   blocking means for modifying the flow of cooling liquid in selected cooling channels.

10. The stationary platen of claim 9, further comprising a forward face confronting a movable platen, the mold elements being fastened to the forward face via the securing means.

11. The stationary platen of claim 9, further comprising means for coupling the manifold means to a face of the stationary platen for connection with a plastics injector.

12. A stationary platen for use in an injection molding machine between a plastics injector and a movable platen, the stationary platen comprising
   a generally rectangular block having a pair of parallel faces and having a plurality of regularly spaced mold element-receiving chambers extending through the platen between the pair of parallel faces,
   a plurality of separate cooling channels penetrating the block generally orthogonal to, and intersecting, each mold element-receiving chamber,
   means for securing mold elements substantially wholly within the block, and
   a plurality of spaced O-ring receiving grooves within each mold element-receiving chamber, one of the O-ring receiving grooves being situated between each of the plurality of separate cooling channels so that each cooling channel is substantially fluidly and thermally isolated from adjacent neighboring cooling channels.

13. The stationary platen of claim 12, further comprising a forward face confronting a movable platen, the mold elements being fastened to the forward face by the securing means.

14. A mold element inserted into a stationary platen of an injection molding machine, the stationary platen having a forward face confronting a movable platen, the mold element comprising
   an outer end formed to include an opening for receiving a mold core carried by the movable platen,
   a body portion having an inside wall defining a molding cavity in communication with the opening formed in the outer end and an outside wall configured to define a plurality of separate channels for selectively receiving flows of cooling liquid,
   means for coupling the flange to the forward face of the stationary platen to hold the mold element within the stationary platen so that the mold element is insertable into the stationary platen through a space definable between the stationary and movable platen.

15. The mold element of claim 14, wherein the flange is formed to include at least one channel for selectively receiving cooling liquid.

16. The mold element of claim 14, wherein the flange is defined by a collar extending in a radially outward direction away from the mold core-receiving opening.

17. The mold element of claim 14, wherein the flange includes a ring having an outside diameter greater than the outside diameter of the tubular body portion.

18. The mold element of claim 14, wherein the stationary platen is formed to include chamber means for receiving the body portion of the mold element substantially wholly within the stationary platen, and dispensing means for dispensing selected flows of cooling liquid into at least one of the plurality of separate channels formed in the outside wall of the body portion.

* * * * *